(12) United States Patent
Wiethege et al.

(10) Patent No.: US 8,958,056 B2
(45) Date of Patent: Feb. 17, 2015

(54) TRIANGULATION LIGHT SENSOR

(71) Applicant: Sick AG, Waldkirch (DE)

(72) Inventors: Friedhelm Wiethege, Sexau (DE); Gerhard Merettig, Sexau (DE)

(73) Assignee: Sick AG, Waldkirch (DE)

( * ) Notice: Subject to any disclaimer, the term of this patent is extended or adjusted under 35 U.S.C. 154(b) by 24 days.

(21) Appl. No.: 13/768,618

(22) Filed: Feb. 15, 2013

(65) Prior Publication Data

US 2013/0215409 A1 Aug. 22, 2013

(30) Foreign Application Priority Data

Feb. 16, 2012 (EP) ..................................... 12001008

(51) Int. Cl.
*G01C 3/08* (2006.01)
*G01S 17/48* (2006.01)
*G01B 11/02* (2006.01)
*G01S 7/481* (2006.01)

(52) U.S. Cl.
CPC . *G01C 3/08* (2013.01); *G01S 17/48* (2013.01); *G01B 11/026* (2013.01); *G01S 7/4816* (2013.01)
USPC ....... 356/3.01; 356/3.09; 356/4.01; 356/4.07; 356/5.01; 356/5.09; 356/5.1; 356/9; 356/625

(58) Field of Classification Search
CPC ............ G01B 11/02; G01C 3/08; G01C 3/10; G01S 17/48; G01S 7/481; G01S 7/491; G02B 7/32
USPC ............. 356/3.01, 3.09, 4.01, 4.07, 5.01, 5.1, 356/5.09, 9, 625
See application file for complete search history.

(56) References Cited

U.S. PATENT DOCUMENTS 4,317,991 A * 3/1982 Stauffer ...................... 250/201.4
4,830,443 A * 5/1989 Hecker et al. .............. 359/210.1
(Continued)

FOREIGN PATENT DOCUMENTS

DE        198 50 270 A1    5/1999
DE   10 2004 009 484 A1    5/2005
(Continued)

OTHER PUBLICATIONS

European Search Report cited in European Application No. 12001008.7, dated May 8, 2012. English translation is attached.

*Primary Examiner* — Isam Alsomiri
*Assistant Examiner* — Samantha K Abraham
(74) *Attorney, Agent, or Firm* — Nath, Goldberg & Meyer; Jerald L. Meyer

(57) ABSTRACT

A triangulation light sensor includes at least one light transmitter for transmitting a light signal into a detection zone, a light receiver having a plurality of receiver elements for receiving light from the detection zone reflected diffusely and/or specularly, and a reception optics arranged between the detection zone and the light receiver in the beam path, with the position of a light spot produced on the light receiver in a triangulation direction by the reflected light resulting in dependence on the distance of the object. The reception optics includes at least one multisegmented lens element having a plurality of lens segments with mutually spaced apart optical axes in the triangulation direction and at least one freeform lens element or one diffractive-optical element having a multisegmented lens element having a plurality of lens segments with optical axes spaced apart from one another in the triangulation direction.

10 Claims, 4 Drawing Sheets

(56) References Cited

U.S. PATENT DOCUMENTS

Figure 1:
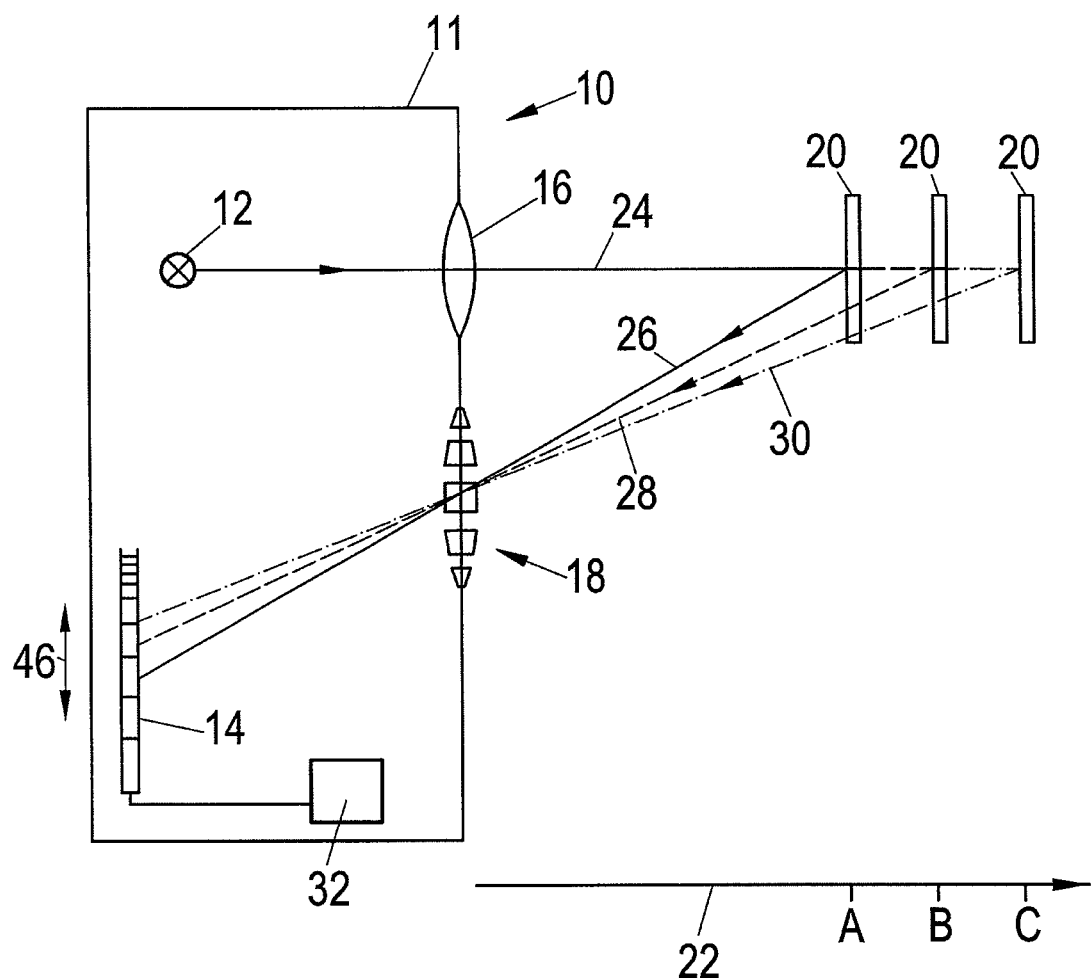

| | | |
|---|---|---|
| 7,165,849 B2 * | 1/2007 | Masuzawa et al. ............ 353/101 |
| 2008/0130005 A1 | 6/2008 | Waslowski et al. |
| 2010/0085580 A1 | 4/2010 | Droemer |
| 2010/0118292 A1 * | 5/2010 | Park et al. .................... 356/5.01 |
| 2010/0289035 A1 * | 11/2010 | Muschaweck et al. ......... 257/84 |

FOREIGN PATENT DOCUMENTS

| | | |
|---|---|---|
| DE | 102006055743 A1 | 5/2008 |
| DE | 10 2007 004 632 A1 | 7/2008 |
| EP | 1 111 332 B1 | 6/2001 |

* cited by examiner

TRIANGULATION LIGHT SENSOR

The invention relates to a triangulation light sensor having at least one light transmitter for transmitting a light signal into a detection zone, having a light receiver which has a plurality of receiver elements for receiving light from the detection zone reflected diffusely and/or specularly and having a reception optics which is arranged in front of the light receiver in the beam path, with the position of a light spot produced on the light receiver in a triangulation direction by the reflected light resulting in dependence on the distance of the object.

It is known to determine the distance of objects in a monitored zone using light sensors which work according to the triangulation principle. Such a light sensor, such as is described in DE 198 50 270 A1, for example, includes a light transmitter, for example a light-emitting diode or a laser, and optionally includes a transmission optics to transmit a light beam into a detection zone to an object to be detected which may be located there. The transmitted light can be reflected by such an object and can be detected by a light receiver which forms a reception element together with a reception optics. The light receiver in known solutions comprises an array of photosensitive receiver elements.

The position of a light spot produced on the light receiver by the reflected light varies in the so-called triangulation direction in dependence on the distance between the triangulation light sensor and the reflected object. There is a clear geometrical relationship between the point of incidence on the light receiver and the distance of the detected object. The distance between the object and the light sensor can thus be determined by evaluating the light distribution on the light receiver. Furthermore, on a corresponding evaluation of the light distribution on the light receiver, it can be determined whether an object is located inside or outside a scanning zone, i.e. whether the distance of the object lies inside or outside predefined limits.

In order e.g. to achieve a high accuracy in the distance determination, such a light receiver must have a plurality of photosensitive receiver elements which are arranged next to one another in the triangulation direction.

With triangulation light sensors with background suppression, the light receiver includes at least two receiver elements, with a so-called near element being hit by a light ray when it is reflected by an object which is arranged in a near region in front of the triangulation light sensor and a far element is hit by a light ray which is reflected by an object which is located in a far region in front of the triangulation light sensor.

The difference between the photodiode currents of these two elements is formed for the signal evaluation. To set the boundary between the near region and the far region, the receiver element, the reception optics or a mirror is mechanically moved, e.g. with mechanically adjustable systems, and the focus of the light spot formed by the light receiver is centered on the physically present dividing web between the near element and the distance element.

In triangulation light sensors with background suppression without mechanically moved elements, the light spot is imaged e.g. on a multisegmented light receiver. Such systems simulate a difference diode with an electronically adjustable dividing web to realize a triangulation light sensor with background or foreground suppression. When light receivers with a plurality of receiver elements are used, the dividing web can in this manner only be adjusted electronically in discrete stages and can only lie on the physically present dividing webs between the individual receiver elements. The light receiver has to be divided into sufficiently small receiver elements for a setting of the border between the foreground and the background. This likewise makes the use of highly resolved and long photodiode arrays with a large number of receiver elements necessary.

In both described systems of the prior art it is desirable if the exact position of the light spot on the light receiver is known with an accuracy which is not defined by the minimal size of the receiver elements.

The European patent application EP 1 111 332 B1 describes a method for this purpose with which the determination of the position of the focus of a light spot on a photodiode array can be determined with an accuracy which is no longer dependent on the spatial dimensions of the individual photodiode cells, that is the receiver elements. For this purpose, the size of the photodiode cells is selected such that a light spot is incident on at least three adjacent photodiode cells and the position of the focus is determined by a suitable evaluation of the signals.

The necessity thus results that at least three photodiode cells have to be hit by the light spot in the direction of the arrangement of the photodiode cells.

This three-element criterion can in particular no longer be satisfied under certain circumstances with a given geometry of the receiver element array with light transmitters with a very small emission surface such as laser diodes or spot LEDs. A increase in size of the light spot is e.g. helpful here.

A possibility for increasing the size of the light spot is to position the light receiver outside the focus of the reception optics. Infrafocal or extrafocal arrangements are conceivable in this respect.

A rotationally symmetrical size increase of the light spot resulting from this can, however, result in overexposure of the receiver elements transversely to the triangulation direction and thus in energetic losses. In addition, a light spot on the light receiver outside the plane of focus has a considerable blur, whereby the detection precision is degraded.

To increase the size of the light spot on the light receiver in particular in the triangulation direction, toric reception optics are used in other known solutions which have different focal lengths in the sagittal plane and in the meridional plane. An imaging thereby takes place in the sagittal plane and meridional plane with different imaging scales so that the plane of focus of the sagittal plane and of the meridional plane lie behind one another. If now a light receiver is introduced into the plane of focus of the shorter focal length, it lies infrafocally outside the plane of focus in the triangulation direction. While the light spot is therefore imaged in focus transversely to the triangulation direction, the image is blurred in the triangulation direction and is widened in this respect. In such an arrangement, the light spot on the light receiver, however, has a considerable blue particularly in the relevant triangulation direction so that the detection precision is also degraded here.

It is the object of the present invention to provide a triangulation light sensor with which the light spot on the light receiver can be increased in size in the triangulation direction without too much of a negative influencing of the detection sensitivity.

This object is satisfied by a triangulation light sensor having the features of claim 1. Provision is made in accordance with the invention that the reception optics of the triangulation light sensor includes at least one multisegmented lens element which comprises a plurality of lens segments in the triangulation direction with mutually spaced apart optical axes. In this manner, a string of individual images of the light spot arises in the plane of the light receiver, while no such splitting is present transversely to the triangulation direction. The aspect ratio of length to width of the light spot on the light receiver as well as the homogeneity or the illuminance extent in the triangulation direction can be defined via the segment number, the segment width and the spacing of the optical axes of the individual segments from one another depending on the demands. With a predefined aspect ratio, the homogeneity is the larger, the higher the number of segments.

A substantial advantage of a triangulation light sensor with such a reception optics is that when the desired spacing is present between the reception optics and the light receiver, each of the arising individual images can be imaged in focus on the light receiver. The uniformity can be adapted in a wide range by a suitable superposition of the individual images of the individual segments. The satisfaction of the above-described three-element criterion and an optimum ratio of light spot size to receiver element size can be achieved by the adapted number of segments, whereby a high detection sensitivity can be ensured.

A simple and reliable ensuring of the described effect can be achieved if the lens segments have the same focal length and only the optical axes associated with them are displaced in the triangulation direction.

Arrangements are, however, also possible in which the individual lens segments additionally have different focal lengths which are adapted to the geometry and to the necessities of the respective arrangement, that is e.g. if the space requirement is small.

It is generally also possible that the individual lens segments have freeform surfaces as surfaces which are used for setting the desired geometry and uniformity of the imaged light spot.

Another embodiment in accordance with the invention provides for the use of a reception optics which includes at least one freeform lens element which has at least one freeform surface which is formed such that the freeform lens element corresponds to a multisegmented lens element which comprises a plurality of lens segments in the triangulation direction with mutually spaced apart optical axes. Such a freeform lens element simulates the above-described lens element of the first embodiment split into lens segments so that the same effects can be achieved with it as with the above-described multisegmented lens element. It is, however, not necessary here to adjust individual lens segments with respect to one another since the integral freeform lens element takes over the function of the multisegmented lens elements.

Provision is made in another embodiment that the reception optics has at least one diffractive optical element which is configured such that its optical deflection properties correspond to a multisegmented lens element which comprises a plurality of lens segments in the triangulation direction with mutually spaced apart optical axes.

In this embodiment, the correspondingly configured diffractive-optical element takes over the function of the multisegmented lens element. Such a diffractive-optical element can be manufactured simply and is very simple in application and in adjustment.

The same advantages and possibilities such as are described above for the multisegmented lens element can be achieved with a diffractive-optical element configured as described.

Lens segments can e.g. be simulated which have different focal lengths in addition to the offset of their optical axes both in embodiments having a lens element with a freeform surface configured as described above and with a diffractive-optical element configured as described above.

Further preferred embodiments of the triangulation light sensor in accordance with the invention are described in the dependent claims, in the description and in the drawings.

Figure 2:
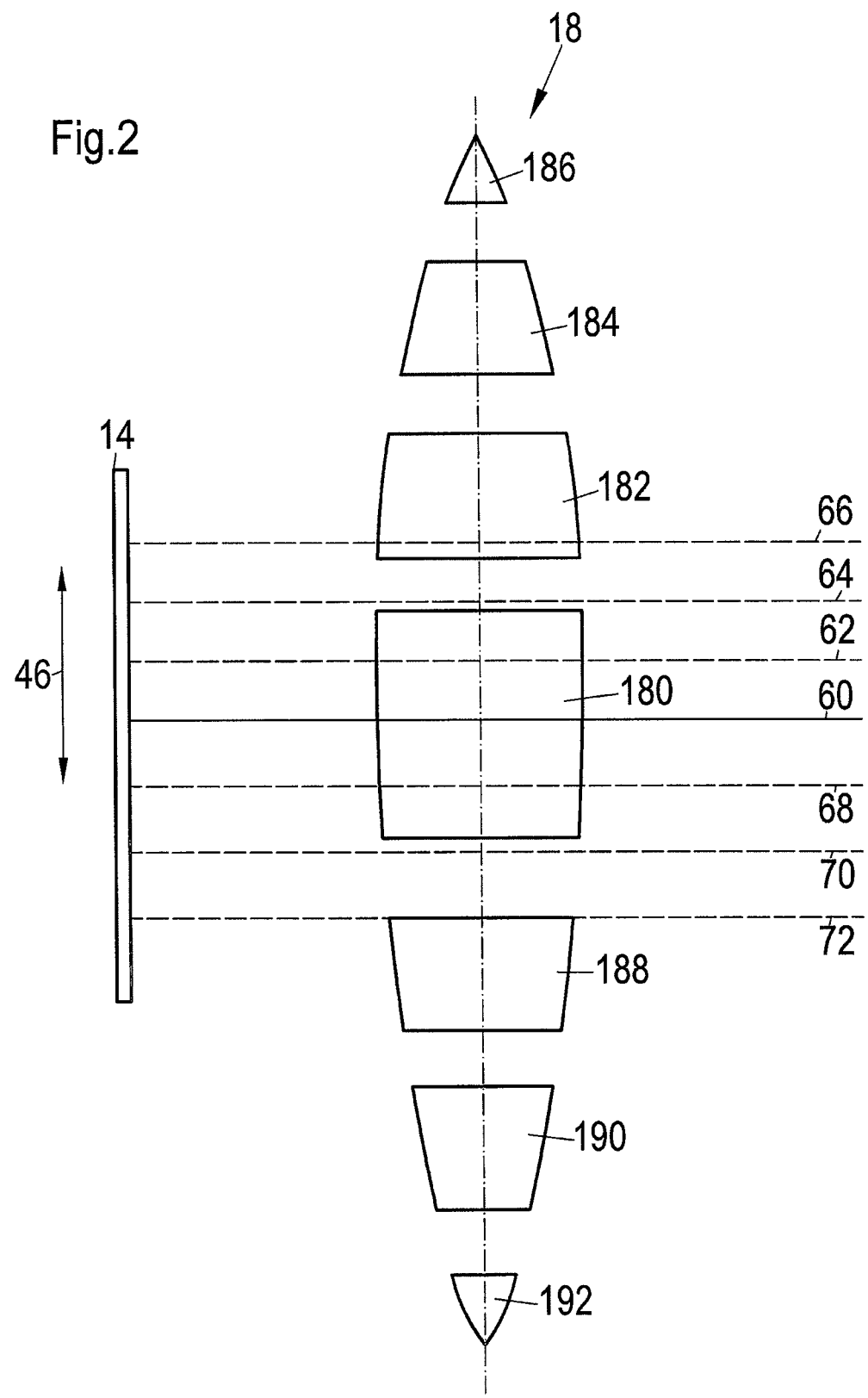
Figure 3:
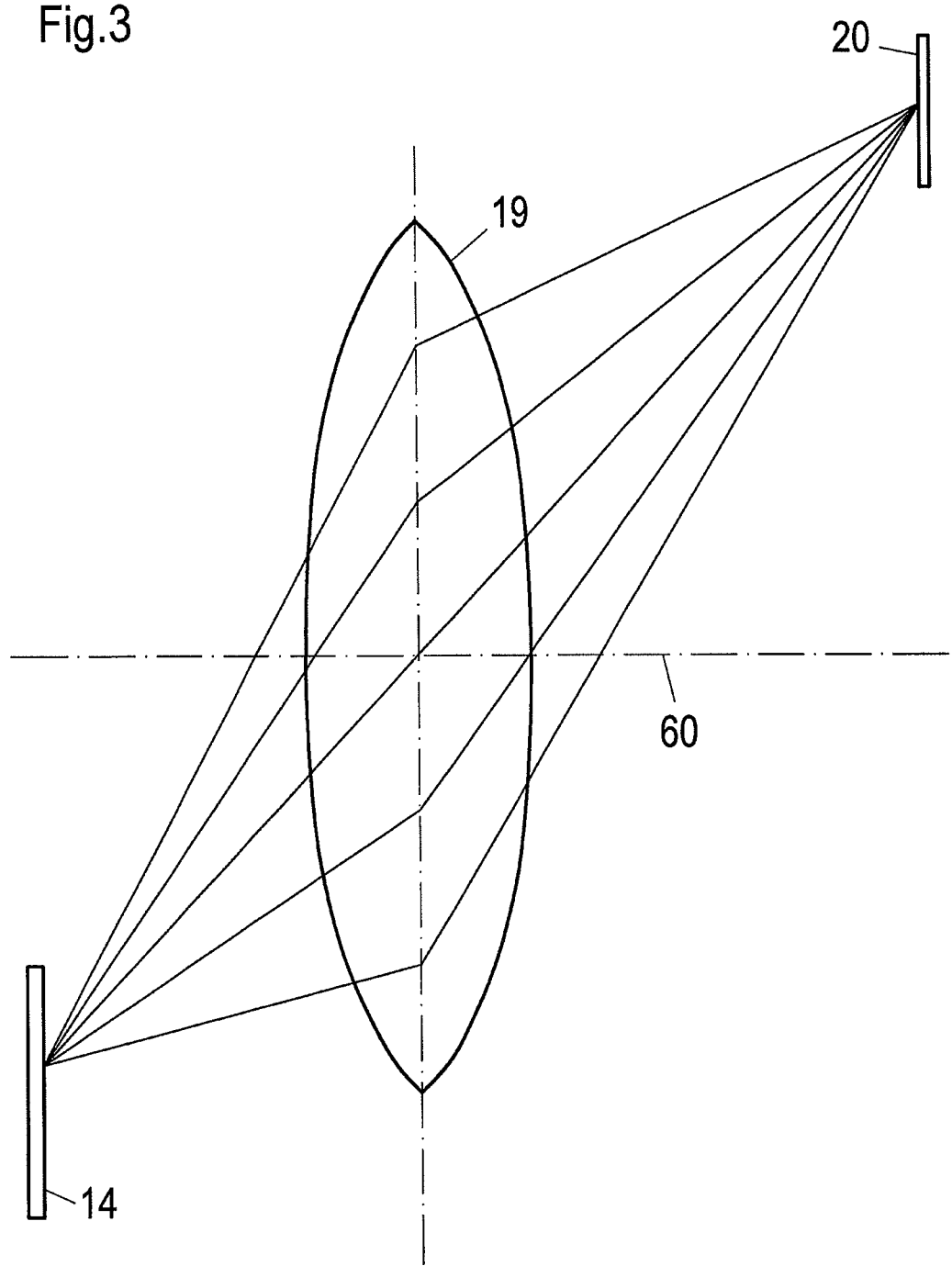
Figure 4:
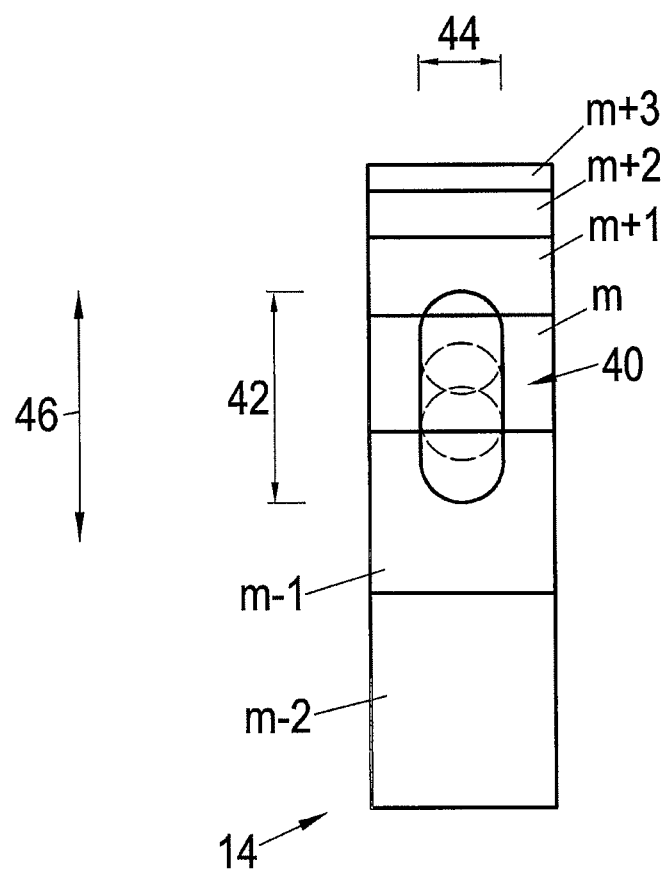

The invention will be described in the following with reference to an embodiment and to the enclosed drawings. In this respect, the Figures are to be understood schematically and not to scale. There are shown:

FIG. 1 a schematic representation of a triangulation light sensor in accordance with the invention;

FIG. 2 a schematic representation of a segmented lens element, with the triangulation device being in the image plane;

FIG. 3 a comparative representation of the beam path of a non-segmented lens element; and FIG. 4 a plan view of a light receiver of a triangulation light sensor in accordance with the invention with a light spot widened in the triangulation direction.

FIG. 1 shows a triangulation light sensor 10. Light 24 from a light source 12, e.g. a laser diode, is transmitted by a transmission optics 16 in the direction of a detection zone which is indicated by the arrow 22. The light 24 is incident on an object 20 in the detection zone 22 and is reflected back from this object to the triangulation light sensor 10. The light is incident on the light receiver 14 through the reception optics 18. In this respect, the light ray 26 shows the beam path of a light ray which is reflected at an object 20 which is located in the position A; the light ray 28 shows the beam path of a light ray which is reflected by an object 20 which is located in the position B; and the light ray 30 shows the beam path of a light ray which is reflected by an object 20 which is located in the position C. The light is forwarded onto the light receiver 14 through the reception optics 18. This light receiver 14 comprises a plurality of photodiode elements which are arranged next to one another in the triangulation direction 46. The signal of this photodiode array is—as shown schematically here—evaluated by an evaluation unit 32 which can draw a conclusion on the position of the object 20 from the position of the focus of the light spot formed on the light receiver 14. The components of the triangulation sensor can be arranged in a housing 11, with the reception optics 18 representing an aperture. A clear geometrical relationship is present between the position of the focus of the light spot on the light receiver 14 and the position of the object 20. In the embodiment shown, the individual receiver elements of the light receiver 14 have a different extent in the triangulation direction 46 to take the circumstance into account that on a smaller spacing between the object 20 and the triangulation light sensor 10, the change in the position of the light spot on the light receiver 14 is larger on displacement of the object 20 by a specific absolute value than the change in the position of the light spot on the light receiver 14 with the same absolute displacement when the object 20 is located at a greater spacing from the triangulation light sensor 10.

The evaluation unit 32 determines the spacing of the object 20 from the triangulation light sensor 10 from the position of the focus of the light spot in the triangulation direction 46.

The reception optics 18 is shown enlarged in size in FIG. 2, with the triangulation direction 46 being located in the image plane. The reception optics here includes a segmented lens element 18 with a plurality of segments 180, 182, 184, 186, 188, 190 and 192. In the simple embodiment described here, this segmented lens element 18 can be thought of as if an originally integral lens is split into segments which are displaced so that they have different optical axes. In the example shown, the lens element 180 has the optical axis 60, the lens element 182 the optical axis 62, the lens element 184 the optical axis 64, the lens element 186 the optical axis 66, the lens element 188 the optical axis 68, the lens element 190 the optical axis 70 and the lens element 192 the optical axis 72.

Only for comparison, a non-segmented lens element 19 is shown in FIG. 3, with beam paths being drawn here such as are present if the object 20 and the light receiver 14 are each located in the focal plane. For reasons of simplicity, the optical axis is here also designated by reference numeral 60.

With a segmented lens element 18 of the embodiment in accordance with the invention as is shown in FIG. 2, the individual lens segments image the reflected light on the light receiver 14 in individual images so that a string of individual images results in the triangulation direction, with each of the arising individual images being imaged in focus on the light receiver. The uniformity can be adapted in a wide range by a suitable superposition of the individual images e.g. in the evaluation unit 32. The above-described three-element criterion and an ideal ratio of light spot size to receiver element size can in particular be achieved by a corresponding number of segments.

FIG. 4 shows the plan view of a light receiver 14 in this application. The composition of the light receiver 14 from a plurality of receiver elements which are grouped about the central receiver element m can be seen here. The receiver elements m+1, m+2, m+3 are hit by light spots which are reflected by an object 20 which is positioned at a larger distance from the triangulation light sensor 10 in the detection plane 22, while the receiver elements m−1, m−2 are hit by light spots when the object 20 is located at a greater proximity to the triangulation light sensor 10.

As can be seen in FIG. 4, the light spot 40 arising on imaging by the reception optics 18 shown in FIG. 2 extends here over three receiver elements m+1, m and m−1. The light spots such as arise on the optical imaging by a respective segment of the reception optics 18 are shown dashed and only by way of example here. These individual light spots add up to the total light spot 40.

A light spot 40 in particular arises which has an extent 42 in the triangulation direction 46 and an extent 44 transverse to the triangulation direction 46.

Different spacings or different segmentations of such a lens element allow different aspect ratios of length to width of the light spot or different homogeneity of the light spot, such as is shown by way of example in FIG. 4. With a predefined aspect ratio between the extent 42 in the triangulation direction and the extent 44 transverse to the triangulation direction, the homogeneity is thus e.g. the higher, the higher the selected number of segments.

The described embodiment is a very simple possibility which is easy to realize, with here the focal lengths of the individual lens segments being the same. Other embodiments provide that the focal lengths of the individual lens elements additionally differ with respect to their different optical axis so that an adaptation to a limited space requirement of the triangulation light sensor can e.g. be more easily realized. It is also possible in dependence on the demands that the individual lens segments have freeform surface which allow corresponding imaging geometries which result from the circumstances and the space requirement.

An embodiment is not shown in which the reception optics 18 is formed by a freeform lens element which is formed such that it simulates the segmented lens element 18 which is shown in FIG. 2.

Such a freeform element provides the advantage that fewer technical production limits have to be observed for the desired increase in the number of segments.

A segmented lens element is equally possible in which the individual segments can in turn be formed as freeform surfaces or any desired combinations of freeform segments with spherical or aspherical segments.

In an alternative embodiment, provision is made that the function of the multisegmented lens element is taken over by a correspondingly configured diffractive-optical element.

REFERENCE NUMERAL LIST

10 triangulation light sensor
11 housing
12 transmitted light source
14 light receiver, photodiode array
16 transmission optics
18 reception optics
19 integral lens element
20 object
22 detection zone
24 transmitted light
26, 28, 30 reflected light
32 evaluation unit
40 light spot
42 extent of the light spot in the triangulation direction
44 extent of the light spot transverse to the triangulation direction
46 triangulation direction
60, 62, 64, 66, 68, 70, 72 optical axis
180, 182, 184, 186, 188, 190, 192 lens segment
m−2, m−1, m, m+1, m+2, m+3 receiver element
A, B, C position

The invention claimed is:

1. A triangulation light sensor (10) having
at least one light transmitter (12) for transmitting a light signal (24) into a detection zone (22);
a light receiver (14) which has a plurality of receiver elements (m−2, m−1, m, m+1, m+2) for receiving light (26, 28, 30) from the detection zone (22) reflected diffusely and/or specularly; and
a reception optics (18) which is arranged in the beam path between the detection zone and the light receiver (14),
wherein the position of a light spot (40) produced on the light receiver (14) in a triangulation direction (46) by the reflected light (26, 28, 30) results in dependence on the distance of the object (20),
wherein the reception optics includes at least one multisegmented lens element (18) which comprises a plurality of lens segments (180, 182, 184, 186, 188, 190, 192) with optical axes (60, 62, 64, 66, 68, 70, 72) spaced apart from one another in the triangulation direction (46), the light spot (40) produced on the light receiver (14) is formed by superposition of a plurality of individual images, with each individual image being generated by means of the individual segments (180, 182, 184, 186, 188, 190, 192), and
wherein the multisegmented lens elements (18) corresponds to an arrangement which is generated by splitting an originally integral lens into segments which are displaced so that they have different optical axes (60, 62, 64, 66, 68, 70, 72).

2. A triangulation light sensor in accordance with claim 1, wherein the plurality of light segments additionally have different focal lengths.

3. A triangulation light sensor in accordance with claim 1, wherein the lens segments (180, 182, 184, 186, 188, 190, 192) are arranged and configured such that the light spot produced on the light receiver (14) by the reception optics (18) is elongated in the triangulation direction (46), preferably such that it is incident on at least three receiver elements (m−1, m, m+1).

4. A triangulation light sensor (10) having
- at least one light transmitter (12) for transmitting a light signal (24) into a detection zone (22);
- a light receiver (14) which has a plurality of receiver elements (m−2, m−1, m, m+1, m+2) for receiving light (26, 28, 30) from the detection zone (22) reflected diffusely and/or specularly; and
- a reception optics which is arranged in the beam path between the detection zone and the light receiver (14),
  - wherein the position of a light spot (40) produced on the light receiver (14) in a triangulation direction (46) by the reflected light (26, 28, 30) results in dependence on the distance of the object (20),
  - wherein the reception optics includes at least one freeform lens element which has at least one freeform surface which is formed such that the freeform lens element corresponds to a multisegmented lens element (18) which comprises a plurality of lens segments (180, 182, 184, 186, 188, 190, 192) with optical axes (60, 62, 64, 66, 68, 70, 72) spaced apart from one another in the triangulation direction (46), the light spot (40) produced on the light receiver (14) is formed by superposition of a plurality of individual images, with each individual image being generated by means of the individual segments (80, 182, 184, 186, 188, 190, 192), and
  - wherein the multisegmented lens element (18) corresponds to an arrangement which is generated by splitting an originally integral lens into segments which are displaced so that they have different optical axes (60, 62, 64, 66, 68, 70, 72).

5. A triangulation light sensor in accordance with claim 4, wherein the at least one freeform surface is formed such that the freeform lens element corresponds to a multisegmented lens element in which the lens segments additionally have different focal lengths.

6. A triangulation light sensor in accordance with claim 4, wherein the at least one freeform surface is formed such that the freeform lens element corresponds to a reception optics (18) with a multisegmented lens element (18) with lens segments (180, 182, 184, 186, 188, 190, 192) which are arranged and configured such that the light spot (40) produced on the light receiver (14) by the reception optics (18) is elongated in the triangulation direction (46), preferably such that it is incident on at least three receiver elements (m−1, m, m+2).

7. A triangulation light sensor having
- at least one light transmitter (12) for transmitting a light signal (24) into a detection zone (22);
- a light receiver (14) which has a plurality of receiver elements (m−2, m−1, m, m+1, m+2) for refusing light (26, 28, 30) from the detection zone (22) reflected diffusely and/or specularly; and
- a reception optics which is arranged in the beam path between the detection zone and the light receiver (14),
  - wherein the position of a light spot (40) produced on the light receiver (14) in a triangulation direction (46) by the reflected light (26, 28, 30) results in dependence on the distance of the object (20),
  - wherein the reception optics includes at least one diffractive-optical lens element which is configured such that it corresponds to a multisegmented lens element (18) which comprises a plurality of lens segments (180, 182, 184, 186, 188, 190, 192) with optical axes (60, 62, 64, 66, 68, 70, 72) spaced apart from one another in the triangulation direction (46), the light spot (40) produced on the light receiver (14) is formed by superposition of a plurality of individual images, with each individual image being generated by means of the individual segments (180, 182, 184, 186, 188, 190, 192), and
  - wherein the multisegmented lens element (18) corresponds to an arrangement which is generated by splitting an originally integral lens into segments which are displaced so that they have different optical axes (60, 62, 64, 66, 68, 70, 72).

8. A triangulation light sensor in accordance with claim 7, wherein the at least one diffractive-optical element is configured such that it corresponds to a multisegmented lens element in which the lens segments additionally have different focal lengths.

9. A triangulation light sensor in accordance with claim 7, wherein the at least one diffractive-optical element is formed such that it corresponds to a reception optics with a multisegmented lens element (18) with lens segments (180, 182, 184, 186, 188, 190, 192) which are arranged and configured such that the light spot (40) produced on the light receiver (14) by the reception optics (40) is elongated in the triangulation direction (46).

10. A triangulation light sensor in accordance with claim 9, wherein the light spot is incident on at least three receiver elements (m−1, m, m+2).

* * * * *